Figure 6:
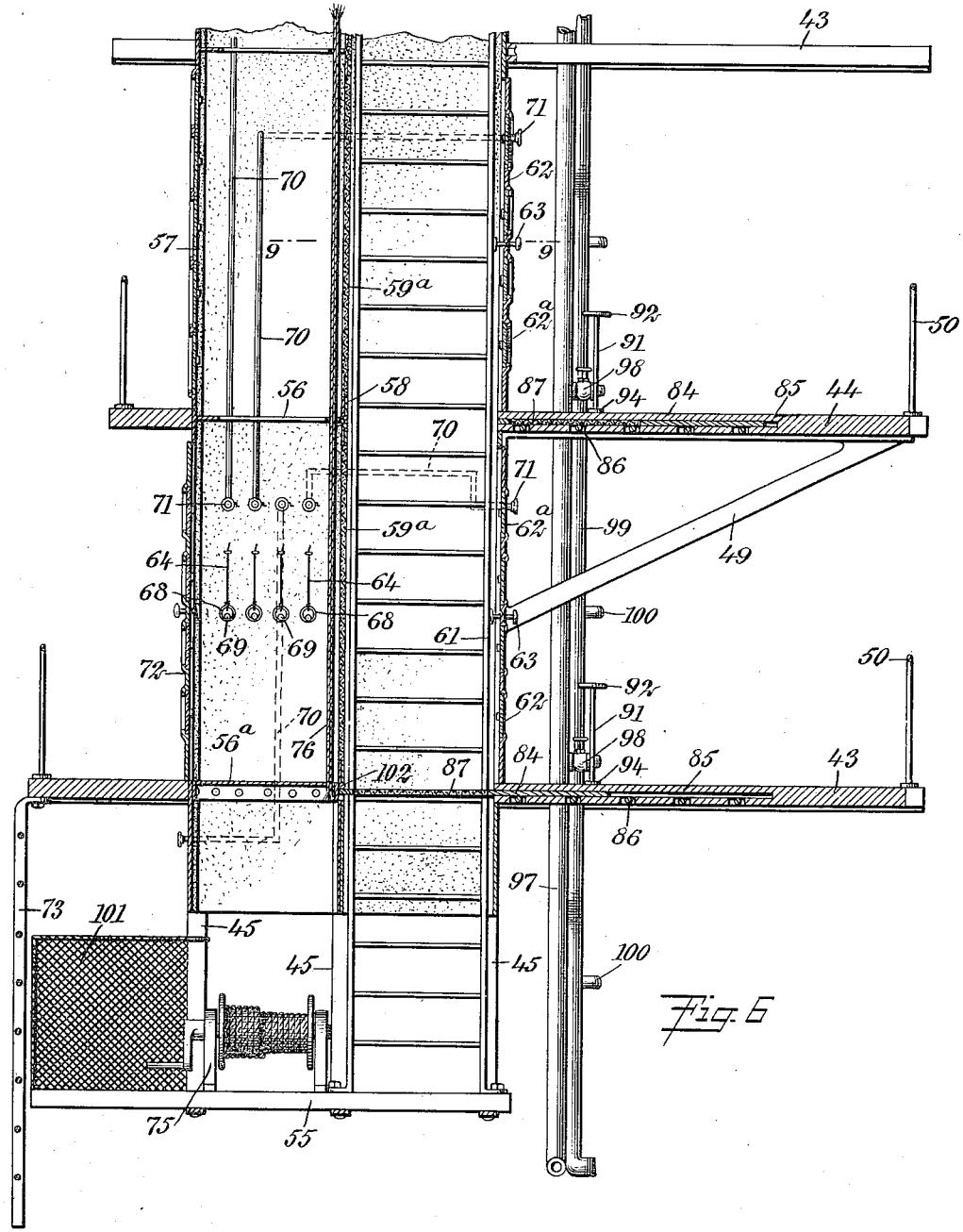

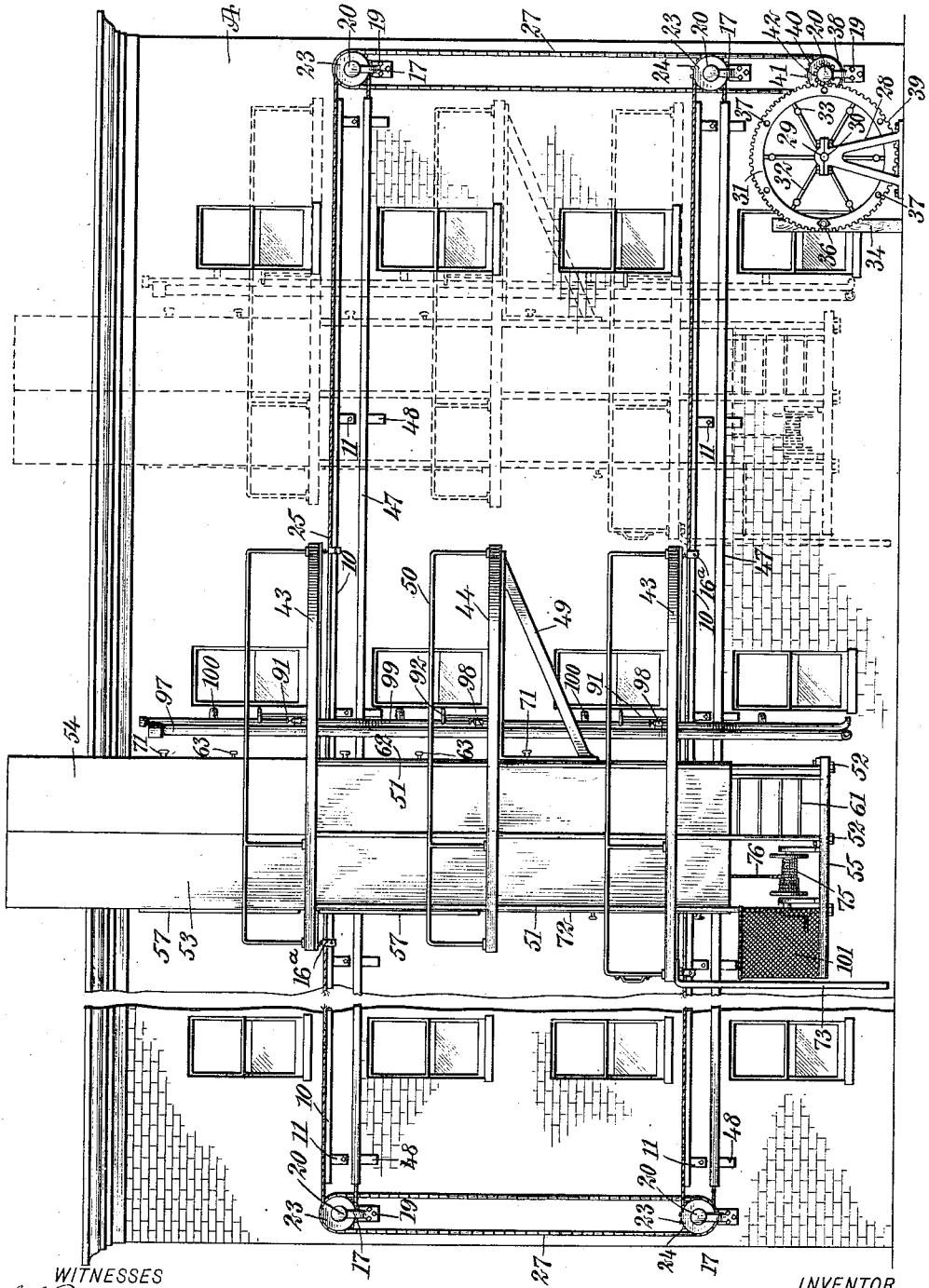

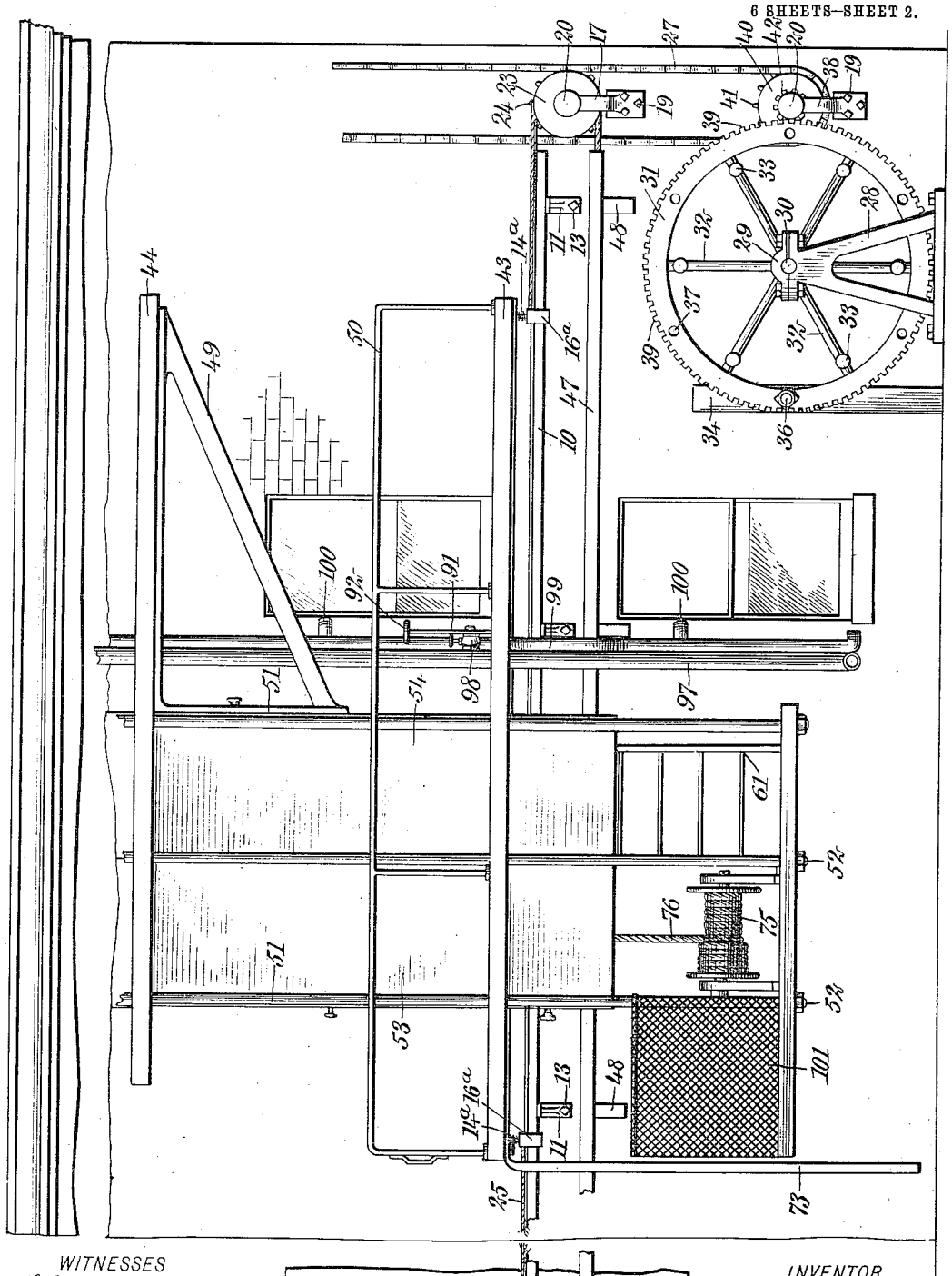
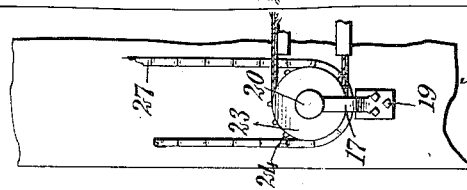

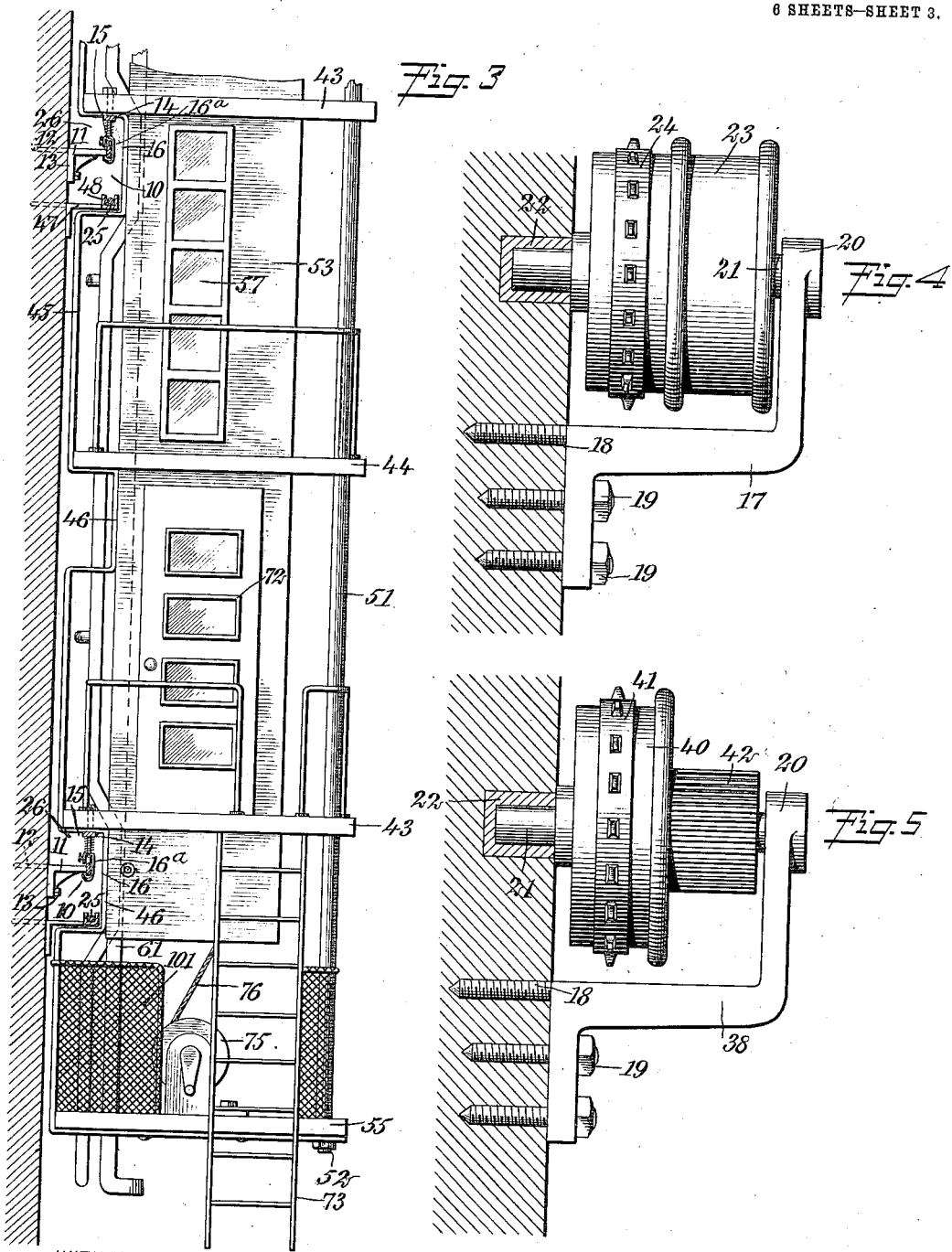

J. SCULLY.
FIRE ESCAPE.
APPLICATION FILED OCT. 10, 1908.

972,576.

Patented Oct. 11, 1910.
6 SHEETS—SHEET 4.

WITNESSES
E. G. Bromley
John K. Braeluogel

INVENTOR
John Scully
BY Munn & Co.
ATTORNEYS

J. SCULLY.
FIRE ESCAPE.
APPLICATION FILED OCT. 10, 1908.
972,576.
Patented Oct. 11, 1910.
6 SHEETS—SHEET 5.
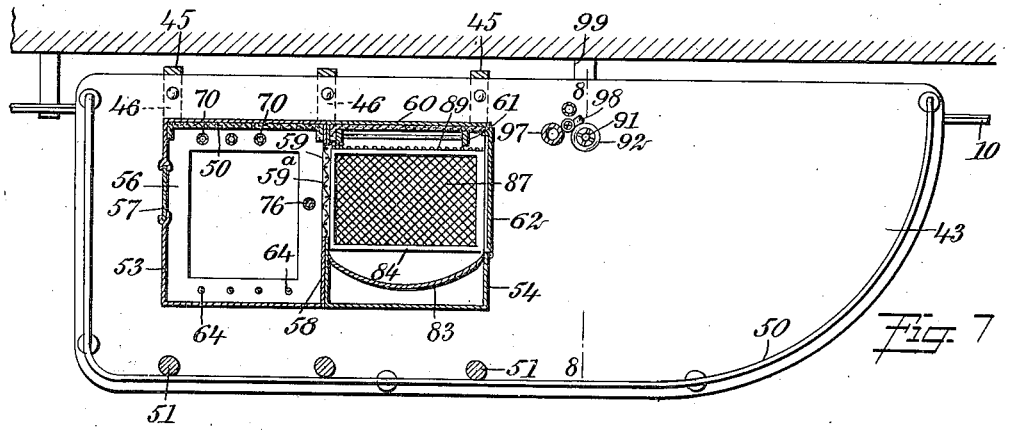
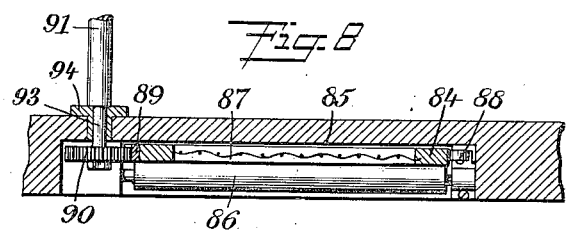
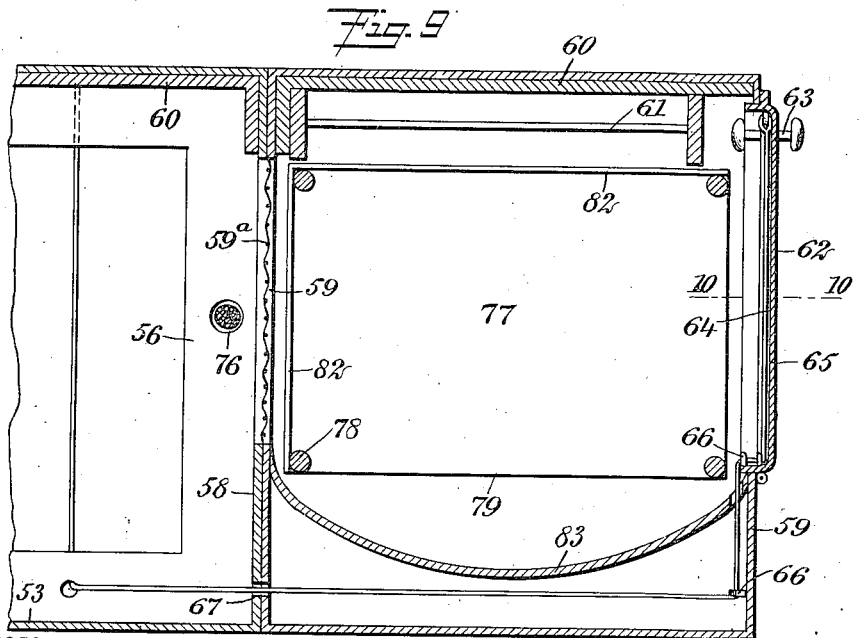
WITNESSES
INVENTOR
John Scully
BY
ATTORNEYS J. SCULLY.
FIRE ESCAPE.
APPLICATION FILED OCT. 10, 1908.
972,576.
Patented Oct. 11, 1910.
6 SHEETS—SHEET 6.
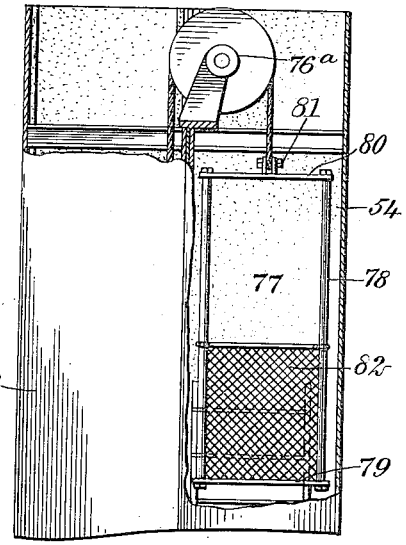
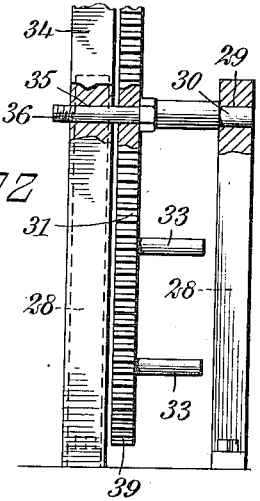
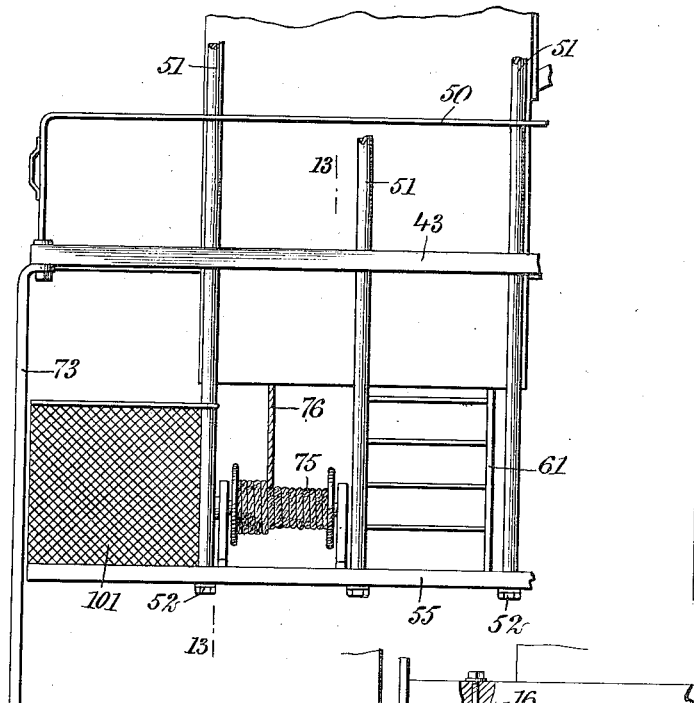
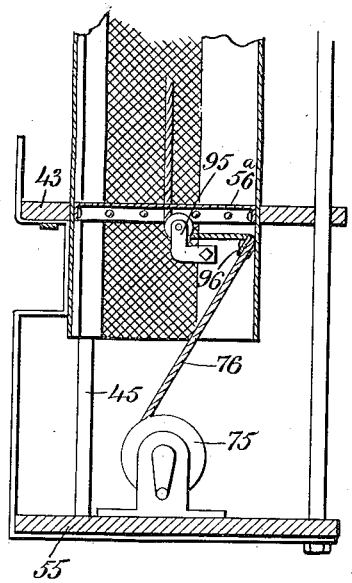
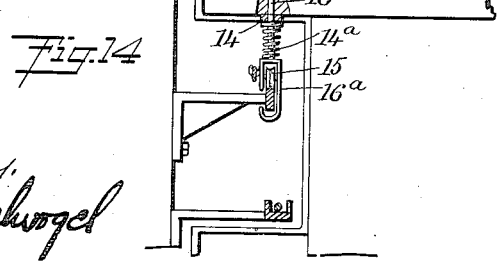
WITNESSES
E. G. Bromley
John K. Bachwogel
INVENTOR
John Scully
BY Munn & Co.
ATTORNEYS

UNITED STATES PATENT OFFICE.

JOHN SCULLY, OF MINNEAPOLIS, MINNESOTA.

FIRE-ESCAPE.

972,576. Specification of Letters Patent. Patented Oct. 11, 1910.

Application filed October 10, 1908. Serial No. 457,048.

*To all whom it may concern:*

Be it known that I, JOHN SCULLY, a citizen of the United States, and a resident of Minneapolis, in the county of Hennepin and State of Minnesota, have invented a new and Improved Fire-Escape, of which the following is a full, clear, and exact description.

This invention relates to fire escapes, and more particularly to a movable fire escape which is permanently secured to a building or the like, which has means for aiding persons to escape from the building in case of danger, which is operable from a point at the foot of the building, and which affords supports for firemen or others at different points of the building, the fire escape further having means for conducting streams of water to different heights, and means for effecting communication between persons at different points of the fire escape and persons on the ground.

An object of the invention is to provide a simple, strong and efficient fire escape, by means of which persons in danger from fire can easily escape from different floors of the building, which is operable in a substantially horizontal direction so that the platform of the escape can be positioned at different tiers of windows, and which is so constructed that in case of panic the fire escape cannot be overcrowded by those seeking to escape by means of it.

A further object of the invention is to provide a device of the class described, which is thoroughly under the control of the firemen or other persons engaged in extinguishing the fire in a burning building, which serves to conduct streams of water to different floors of the building, and which has a speaking tube system or other means for effecting communication between its various platforms and the ground.

A still further object of the invention is to provide a fire escape having a ventilating shaft, an elevator shaft, a car arranged to travel up and down the elevator shaft to assist persons in escaping from the building, the elevator shaft having a ladder, so that persons can employ the same for escaping, and bridges at each of the floors adapted to be projected into the elevator shaft, to minimize the danger of injury should a person fall while descending the fire escape.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is an elevation of a building showing one embodiment of my invention applied thereto; Fig. 2 is an enlarged elevation of a part of the building having my invention applied thereto and showing certain details of construction including one of the fire escape platforms and the means for causing the fire escape to travel in a horizontal direction; Fig. 3 is an enlarged vertical section showing parts of the fire escape in side elevation; Fig. 4 is an enlarged end view showing a drum for endless flexible members to actuate the fire escape; Fig. 5 is a similar view showing another drum for a similar purpose; Fig. 6 is an enlarged longitudinal section of certain of the platforms of the fire escape, showing the elevator shaft and a ventilating shaft; Fig. 7 is an enlarged horizontal section showing one of the platforms in plan; Fig. 8 is an enlarged transverse section on the line 8—8 of Fig. 7; Fig. 9 is an enlarged horizontal section showing the escape shaft and part of the ventilating shaft; Fig. 10 is a transverse section on the line 10—10 of Fig. 9; Fig. 11 is a partial, longitudinal section of parts of the shaft, showing the elevator car and the lower escape platform; Fig. 12 is an end elevation having parts in transverse section showing the mechanism for controlling the fire escape from the ground; Fig. 13 is an enlarged, transverse section on the line 13—13 of Fig. 11; and Fig. 14 is an enlarged transverse section showing a detail.

Before proceeding to a more detailed explanation of my invention, it should be clearly understood that the fire escape can be advantageously employed with buildings having different numbers of floors or stories, and of different sizes. The fire escape comprises a series of platforms arranged one above the other and each corresponding to one of the floors of the building. The platforms are rigidly connected and are arranged to travel horizontally so that they can be disposed in front of different vertical rows of windows as the exigencies of each case may require. My fire escape affords not only means for the escape of people from the building but furthermore, is of great advantage to the firemen or others, in combating the flames. I wish to emphasize that the invention does not reside in particular details of construction, as is shown, for example, in the accompanying drawings, but consists in the underlying principles involved, which will appear more clearly hereinafter, and that substantially all the constructive details can be varied without departing from the spirit of the invention.

Referring more particularly to the drawings, A represents a building of any preferred or common form, having a number of floors, shown for example, to be four in number. At certain of the floors are horizontal tracks 10, preferably having the upper edge beveled or sharpened. The tracks 10 are supported by brackets 11 secured by means of elongated shanks 12 and bolts 13 or in any other convenient manner, at the side of the building. I prefer to employ a track at every second story of the building, though this arrangement can be altered if so desired. Upon each track is movably arranged a runner 14 having at separated points downwardly extending bolt rods 16, which carry yokes 16$^a$ at the lower ends. Between the sides of each yoke is pivoted a grooved wheel 15 adapted to travel upon one of the tracks. The yokes each have the lower end of one of the sides curved inwardly about the lower edges of the tracks to act as guards and hold the runners upon the tracks, thereby preventing the accidental displacement of the fire escape. The platforms 43 are resiliently secured upon the runners by means of the bolt rods, which pass through openings therefor in the platforms, springs 14$^a$ being provided upon the rods 16 between the yokes and the runners to form a cushioned and self-adjusting support for the platforms.

At each end of the track an offset bracket 17 having a screw shank 18 is mounted in position upon the wall by means of the latter, together with screws or bolts 19. The bracket has bearings 20 in which is journaled one end of a shaft 21, and the other end of the shaft 21 is journaled in a bearing 22 set into a suitable recess in the wall. A drum 23 is rigidly secured upon the shaft 21 and has a section 24 provided with teeth and constituting a sprocket. An endless, flexible member 25 is arranged longitudinally of each track and passes around the drums 23. The flexible member has its ends rigidly secured to eyes or extensions 26 of the runners, and thus controls the same. Underneath each runner are brackets 47 extending outwardly from the building and carrying longitudinal channels 48 arranged to receive the lower runs of the flexible member and to support and guide the same. The superimposed drums 23 are connected by means of endless flexible members 27 consisting of chains, passing over the sprockets 24. It will be understood that instead of sprockets and chains, other members, such as cables or the like can be employed.

At one end of the building, and upon the ground, or at the lowest floor, are located standards 28 having bearings 29 at their upper ends in which is journaled a shaft 30. A wheel 31 is carried by the shaft 30 and is provided with peripheral teeth 39. Upon the spokes 32 of the wheel are handles 33 by means of which it can be manually operated in one direction or the other. A substantially vertical post 34 is arranged near the rim of the wheel and has an opening 35 which is normally adapted to receive a pin or bolt 36. The rim of the wheel is provided with a plurality of openings 37 therethrough, which are also adapted to receive the pin 36. When the latter is in one of the openings 37 and the opening 35, the wheel is held against rotation in both directions. A bracket 38 similar to the bracket 17 is mounted upon the wall of the building, adjacent to the wheel 31 and has on its shaft a drum 40 having teeth and constituting a sprocket 41 and a pinion 42. The pinion 42 is in mesh with the teeth 39 of the wheel. One of the chains 27 is extended downwardly and passes about the sprocket 41. In this way, the fire escape platforms can be caused to travel back and forth by suitable corresponding movements of the wheel 31.

The openings 37 in the lower rim of the wheel are so positioned that as each one registers with the opening 35 of the post, the platforms are positioned at a predetermined vertical row of windows. In this way the platforms can be accurately guided into position by the operator of the wheel 31, who judges by means of the opening 37. If so desired, the rows of windows can be numbered and the opening 37 be provided with corresponding indicating numbers.

As shown for example, the runners are two stories apart. An intermediate platform 44 is provided between the adjacent runner platforms 43. Vertical bars or members 45 are arranged transversely of the platform and serve to aid in supporting the same and connecting them together. The vertical members have outwardly offset portions 46 which present shoulders for supporting the platforms at the under side, and by means of them pass at the outside of the runners and the guide channels.

The intermediate platforms 44 have downwardly inclined struts 49 which serve to support them and which are secured to one of the vertical members 45. Rails 50 are arranged about the edges of the platform, which may be of any suitable form, for example, as shown most clearly in Fig. 7, each having one end squared and one end rounded. Vertical frame members 51, preferably three in number, are arranged at the outer edges of the platforms and extend through suitable openings of the same. The members 51 serve to support the platform.
They have the upper and lower ends secured to the upper and lower platforms respectively, in any suitable manner, for instance, by means of threaded ends and bolts 52. The intermediate platforms are secured to the members 51 in any preferred or common fashion.

Two shafts 53 and 54 are arranged in suitable openings of the platform and extend from above the roof to underneath the lowest platform, where they terminate at a somewhat smaller auxiliary platform 55 having the lower ends cut away to permit ingress and egress, and for other purposes which will appear hereinafter. The shafts are fashioned from suitable sheet metal or the like and constitute respectively, an air or ventilating shaft and an elevator shaft. At each floor the ventilating shaft has an open frame 56 which permits the free flow of air longitudinally of the shaft. The ventilating shaft is further provided with glass or other sight openings or windows 57. The shafts are separated by a partition 58 in which are openings 59 having wire netting 59ª or the like arranged across them. Both shafts, at the rear walls, have linings 60 of fireproof material such as asbestos sheeting or the like. At said platform 43 the ventilating shaft has a floor 56ª.
At the rear wall, the escape shaft 54 has a ladder 61 extending longitudinally thereof and serving to permit people to pass up and down the shaft. At each floor it has a door 62 swinging outwardly, and provided with handles 63. A line 64 is secured to the door adjacent to the free edge of the same and extends transversely of the door in a suitable groove 65. The lines of the various doors pass through guiding eyes 66 and openings 67 in the partition 58 to the ventilating shaft, down which they extend to the lowest platform 43. They terminate in rings 68 adapted to be caught upon hooks 69 to hold the doors in closed position. In this way every door can be controlled from the lowest platform, where the person in charge of the firemen can assume his position to direct the operation. Every platform is connected with the lowest platform 43 by means of speaking tubes 70 having mouth pieces 71, within the ventilating shaft at the lowest platform. A door 72 gives entrance to the ventilating shaft at this lowest platform. At other platforms the ventilating shaft is not provided with doors, but has merely sight openings or windows 57, to permit light to pass through the ventilating shafts and the openings 59 to the escape shaft. A short ladder 73 leads from the lowest platform 43 to the ground.

A windlass 75 which can be adapted for manual or other operation, is arranged upon the platform 55. A line 76 such as a cable, is controlled by the windlass and passes up the ventilating shaft, over a sheave 76ª at the top of the shaft and into the escape shaft. The line 76 is directed by means of guide pulleys 95, 96, within the ventilating shaft. An elevator car 77 is arranged to move longitudinally of the escape shaft and has a frame work consisting of uprights 78, a floor 79, and a cross-bar 80, to which the line or cable 76 is secured by means of a suitable bracket 81. The sides 82 of the car are preferably of wire netting or the like. At the outer wall of the escape shaft is a curved inner wall 83, extending longitudinally and for the purpose of assisting persons in descending the ladder. The curved wall permits a person using the ladder to place his back against the curved wall at any desired intervals to rest from the labor of descending.

At each floor the platforms have movable bridges 84 slidably arranged in recesses 85 of the platform floor. The bridges are guidingly supported upon rollers 86 and consist of an outer frame having a body 87 of wire netting or the like. Guide rollers 88 at the outer edges serve to facilitate the movement of the bridges. At the opposite edges the bridge has a rack 89 in mesh with a pinion 90 rigid with a substantially vertical shaft 91. The latter is controllable by means of a hand wheel 92 at the upper end. Each shaft 91 has a constricted portion 93 journaled in a bearing 94 on its platform. The bridges are arranged to be projected across the escape shaft and thus serve to divide the ladder into sections, to control the passage of persons up and down the shaft. In the escape shaft opposite each platform is a pair of transverse bars 102 arranged in the plane of the bridge, and adapted to receive the end of the bridge frame therebetween to support the bridge when it is projected.

A water conduit or stand pipe 97 extends transversely of the platforms, and at each of the latter has a connection 98 for attaching fire hose, so that water can be pumped to each floor of the building. An air pipe 99 is positioned adjacent to the stand pipe and has connections 100 at each platform, so that firemen or others upon the platform can be supplied with pure air in case of necessity, for example, when in the presence of dense smoke or noxious fumes.

A guard rail 101 of wire netting or the like is provided at one end of the auxiliary platform 55. The ladder 73 passes beyond the edge of the auxiliary platform 55 and furnishes means for mounting this auxiliary platform or leaving it.

The construction of the fire escape throughout, is of suitable metal, and incombustible material such as asbestos or the like can be used wherever its use will prove advantageous.

In case a building catches fire, the firemen can control the use of the fire escape to assist people in escaping from the building, and can employ it as an aid in fighting the flames. One or more firemen can be stationed on each platform. The elevator car can be used for removing persons from the building. On the other hand, the people can also escape by means of the ladder 61. The firemen on the platform, by means of the windlass can easily control the descent of persons in the escape shaft. The doors from the platforms to the escape shaft are controllable by the persons directing the efforts of the firemen, from the lowest platform 43, owing to the provision of the lines 64. If so desired, the doors can be provided with springs or other means for causing them to open automatically when the lines are released. Orders can be transmitted to the various platforms, through the speaking tubes 70. The entire escape can be moved from point to point as necessary, by using the actuating wheels 31. The openings 37 in the rim of the wheel can be so positioned that each one corresponds to a predetermined position of the fire escape at a particular vertical series or row of windows, and it is therefore necessary for the person operating the wheel, visually to judge the movement of the escape.

If necessary, the firemen can be provided with smoke helmets which are air-tight, and fireproof suits into which air is forced from the air pipes, to prevent the men from being overcome by the heat and smoke.

Having thus described my invention I claim as new and desire to secure by Letters Patent:

1. A fire escape, having a plurality of movable platforms, means for moving said platforms from point to point, an escape shaft, and a ventilating shaft connecting said platforms, said shafts communicating interiorly.

2. A fire escape, having a plurality of platforms, an escape shaft connecting said platforms and having a door opening thereinto from each of said platforms, means for controlling all of said doors independently from a common point, an elevator in said shaft, means for moving said elevator longitudinally of said shaft, and a ladder in said escape shaft.

3. A fire escape, having a plurality of movable platforms, means for simultaneously moving said platforms, an escape shaft connecting said platforms, a ventilating shaft connecting said platforms and communicating interiorly with said escape shaft, said shafts at the sides adjacent to the building having heat insulating linings, an elevator in said escape shaft, means for moving said elevator longitudinally of said escape shaft, doors opening into said escape shaft from said platforms, means for controlling said doors from a common point, and speaking tubes connecting one of said platforms with the others of said platforms.

4. A fire escape having a plurality of platforms, an escape shaft connecting said platforms and having a door opening thereinto from each of said platforms, and means for controlling all of said doors independently from a common point.

5. A fire escape having a plurality of superposed platforms, an escape shaft connecting said platforms and having a door opening thereinto from each of said platforms, and lines, each controlling one of said doors and all terminating at a certain one of said platforms, whereby all of said doors can be controlled from a common point.

6. A fire escape, having a plurality of superposed platforms, inclosed shafts connecting said platforms, said shafts communicating interiorly, an auxiliary platform underneath the lowest of said first platforms, said shafts terminating at said auxiliary platform, one of said shafts constituting a ventilating shaft, the other of said shafts constituting an escape shaft.

7. A fire escape, having a plurality of superposed platforms, inclosed shafts connecting said platforms, said shafts communicating interiorly, an auxiliary platform underneath the lowest of said first platforms, said shafts terminating at said auxiliary platform, one of said shafts constituting a ventilating shaft, the other of said shafts constituting an escape shaft, an elevator movable longitudinally of said escape shaft, means on said auxiliary platform for operating said elevator, and a ladder within said escape shaft, said escape shaft at the outer side having a rounded inner wall.

8. A fire escape, having a plurality of platforms, an escape shaft connecting said platforms, a ladder in said escape shaft, doors opening into said escape shaft from said platforms, said escape shaft at the outer side having a rounded inner wall, and means for controlling said doors from a common point.

9. A fire escape, having a plurality of platforms, a ventilating shaft, and an escape shaft connecting said platforms, said shafts having a partition separating the same and provided with screened openings, an elevator movable longitudinally of said escape shaft, a sheave at the upper end of said partition, a cable controlling said elevator and passing over said sheave into said ventilating shaft, and a windlass at the bottom of said ventilating shaft and controlling said cable.

10. A fire escape, having a plurality of platforms movably mounted at the outer side of a wall, an escape shaft connecting said platforms, a door opening into said escape shaft at each of said platforms, lines running from said doors to one of said platforms, means for locking said lines in position, such that said doors are closed, whereby all of said doors can be independently controlled from a common point, and means within said escape shaft for permitting persons to travel up and down the same.

11. A fire escape, having a plurality of platforms, an escape shaft connecting said platforms, a door at each of said platforms, opening into said escape shaft, a bridge normally held in an inoperative position at each of said platforms, and means at each platform for projecting said bridge of said platform into said escape shaft to extend across the same.

12. A fire escape having a plurality of platforms, an escape shaft connecting said platforms, a door at each of said platforms, opening into said shaft, each of said platforms having a recess, rollers within said recesses, bridges movably carried upon said rollers and adapted to be normally held inoperative within said recesses, and means for controlling said bridges to project the same into said shaft or to retract the same into said recesses.

13. A fire escape, having a plurality of platforms, an escape shaft connecting said platforms, a door at each of said platforms, opening into said shaft, each of said platforms having a recess, rollers within said recesses, bridges movably carried upon said rollers and adapted to be normally held inoperative within said recesses, said bridges having racks, pinions adjacent to said recesses and in mesh with said racks, and means for manually controlling said pinions whereby said bridges can be projected and retracted, a ventilating shaft adjacent to said escape shaft, and a partition separating said shafts, said partition being formed to receive said bridges when the same are projected, whereby said bridges are supported in position extending across said escape shaft.

14. A fire escape, having a plurality of platforms, and means for conducting a current of air to each of said platforms from a distant point.

15. A fire escape, having a plurality of platforms, and an air conduit connecting said platforms, and having a discharge opening at each of said platforms whereby air can be conducted to each of said platforms, from a distant point.

16. A fire escape, having a plurality of platforms, an air conduit connecting said platforms and having discharge openings at each of said platforms, and a water conduit connecting said platforms and having discharge openings at each of said platforms.

In testimony whereof I have signed my name to this specification in the presence of two subscribing witnesses.

JOHN SCULLY.

Witnesses:
H. S. DOOLEY,
F. A. GROSS.